(12) United States Patent  (10) Patent No.: US 8,898,675 B2
Matsumoto et al.  (45) Date of Patent: Nov. 25, 2014

(54) METHOD OF CALCULATING PROCESSOR UTILIZATION RATE IN SMT PROCESSOR

(75) Inventors: Shuhei Matsumoto, Yokohama (JP); Hironori Inoue, Ebina (JP); Shintaro Wada, Sakura (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 13/312,468

(22) Filed: Dec. 6, 2011

(65) Prior Publication Data

US 2012/0174114 A1 Jul. 5, 2012

(30) Foreign Application Priority Data

Jan. 5, 2011 (JP) .................................. 2011-000305

(51) Int. Cl.
*G06F 9/46* (2006.01)
*G06F 11/34* (2006.01)
(52) U.S. Cl.
CPC ........ *G06F 11/3423* (2013.01); *G06F 11/3433* (2013.01); *G06F 2201/88* (2013.01)
USPC .......................................... 718/105; 718/106

(58) Field of Classification Search
None
See application file for complete search history.

(56) References Cited

U.S. PATENT DOCUMENTS

| 7,555,753 | B2 * | 6/2009 | Olszewski et al. ............. 718/100 |
| 7,657,893 | B2 | 2/2010 | Armstrong et al. |
| 8,640,133 | B2 * | 1/2014 | El-Shishiny et al. ......... 718/102 |

\* cited by examiner

*Primary Examiner* — Meng An
*Assistant Examiner* — Wissam Rashid
(74) *Attorney, Agent, or Firm* — Foley & Lardner LLP

(57) ABSTRACT

The method of calculating the processor utilization for each of logical processors in a computer, including the steps of: dividing the computation interval in which the processor utilization by each logical processor is to be calculated into a single task mode (ST) execution interval and a multitask mode (MT) execution interval, appropriately calculating them based on the before-and-after relation between two times; and adding the MT execution interval multiplied by a predetermined MT mode processor resource assignment ratio to the ST mode execution interval to obtain the processor utilization for the calculation-targeted logical processor in the computation interval.

5 Claims, 16 Drawing Sheets

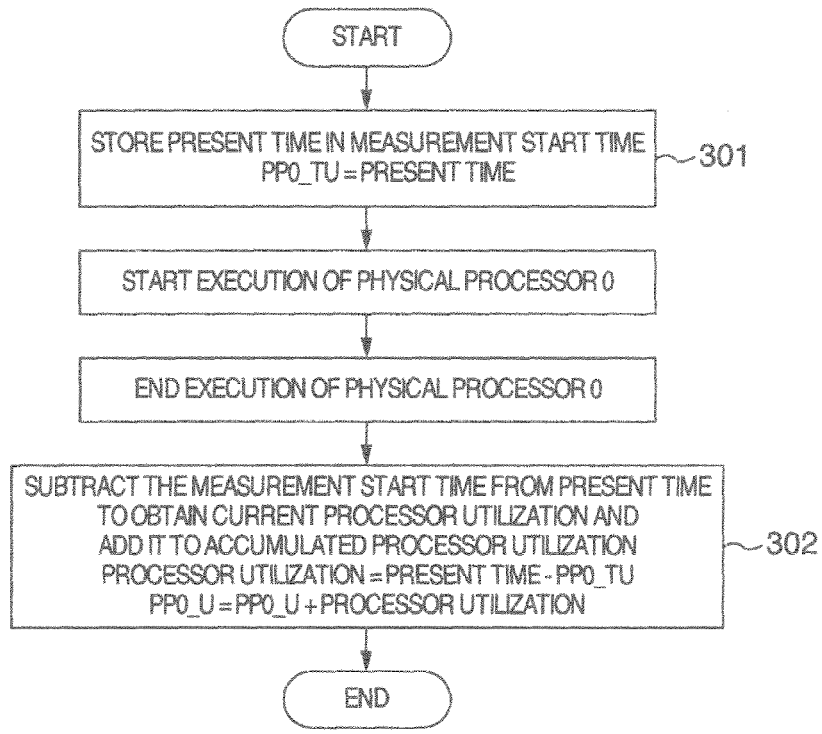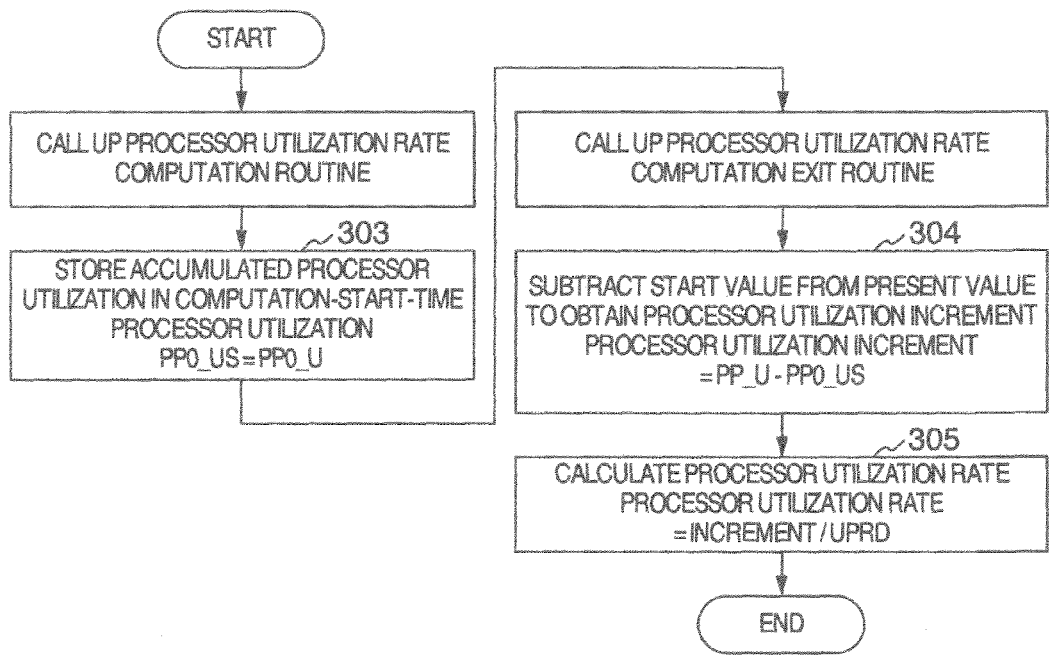

FIG.7

| Block | Field | ID |
|---|---|---|
| PHYSICAL PROCESSOR BLOCK | ACCUMULATED PROCESSOR UTILIZATION PP_U | 150 |
| | COMPUTATION-START-TIME PROCESSOR UTILIZATION PP_US | 151 |
| LOGICAL PROCESSOR BLOCK | POINTER TO ANOTHER LOGICAL PROCESSOR BELONGING TO SAME PHYSICAL PROCESSOR | 160 |
| | ACCUMULATED PROCESSOR UTILIZATION LP_U | 161 |
| | ACCUMULATED RUN TIME LP_R | 162 |
| | ACCUMULATED ST MODE RUN TIME LP_SR | 163 |
| | PROCESSOR UTILIZATION MEASUREMENT START TIME LP_TU | 164 |
| | COMPUTATION-START-TIME PROCESSOR UTILIZATION LP_US | 165 |
| | ACCUMULATED SLEEP DURATION LP_H | 166 |
| | MOST RECENT SLEEP START TIME LP_HS | 167 |
| | MOST RECENT SLEEP EXIT TIME LP_HE | 168 |
| | CURRENT ACCUMULATED SLEEP DURATION OF ANOTHER LOGICAL PROCESSOR LP_HP | 169 |
| PROCESS BLOCK | ACCUMULATED PROCESSOR UTILIZATION PR_U | 180 |
| | ACCUMULATED RUN TIME PR_R | 181 |
| | ACCUMULATED ST MODE RUN TIME PR_SR | 182 |
| | PROCESSOR UTILIZATION MEASUREMENT START TIME PR_TU | 183 |
| | COMPUTATION-START-TIME PROCESSOR UTILIZATION PR_US | 184 |
| | PRESENT ACCUMULATED SLEEP DURATION OF ANOTHER LOGICAL PROCESSOR PR_HP | 185 |
| SYSTEM BLOCK | PHYSICAL PROCESSOR RESOURCE ASSIGNMENT RATIO MRTO | 190 |
| | PROCESSOR UTILIZATION COMPUTATION PERIOD UPRD | 191 |

(LEGEND)

Ts : PROCESSOR UTILIZATION COMPUTATION START TIME

Ta : MOST RECENT SLEEP START TIME

Te : PROCESSOR UTILIZATION COMPUTATION EXIT TIME

Tb : MOST RECENT SLEEP EXIT TIME

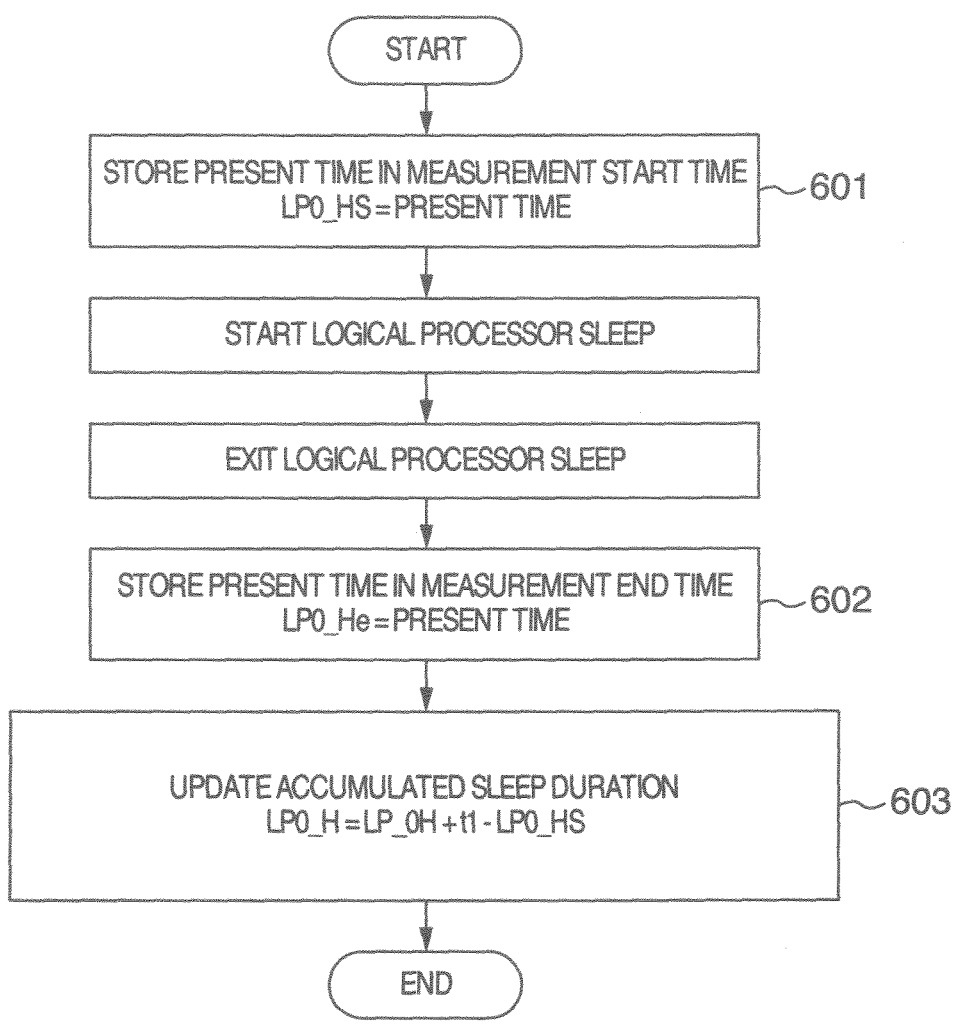

METHOD OF CALCULATING PROCESSOR UTILIZATION RATE IN SMT PROCESSOR

INCORPORATION BY REFERENCE

The present application claims priority from Japanese application JP2011-000305 filed on Jan. 5, 2011, the content of which is hereby incorporated by reference into this application.

BACKGROUND OF THE INVENTION

The present invention relates to a computer system and more particularly to a method of calculating a processor utilization rate in a simultaneous multi-threading (hereinafter referred to as an SMT) processor and in an SMT processor environment.

Among very important approaches to improving performance of a processor and utilization of processor resources, there is a parallelization of instruction executions in the processor. Efforts have long been made to improve parallelism of instruction executions in one thread using a super scalar processor technology. In addition to this, recent years have seen a progressive improvement of thread-level parallelism being made based on a multi-threading technology that executes a plurality of threads on a single processor.

The multi-threading technologies that have come into wide use on processors include a simultaneous multi-threading (SMT). The SMT is a technique that makes one processor operate as a plurality of logidal processors by running it in two or more threads simultaneously. In the SMT capable of executing a plurality of threads simultaneously, these threads are called logical processors because the system takes these threads as a plurality of logical processors.

The SMT allows a plurality of logical processors to be active simultaneously with these logical processors contending for resources available in one processor. The SMT can improve an overall throughput of a plurality of software threads by letting a plurality of logical processors dynamically share the processor resources among them.

The SMT can also guarantee a performance equivalent to that of a single thread processor not only for a plurality, of software threads but also for a single software thread.

Take for example an SMT processor with two logical processors, such as a logical processor 0 and a logical processor 1. With this SMT processor there are two cases: one in which only one logical processor is active and one in which both of the two logical processors are active. The SMT processor offers two operation modes for these cases: a single task (ST) mode and a multitask (MT) mode. The ST mode is further broken down into an ST0 mode in which only the logical processor 0 is active and an ST1 mode in which only the logical processor 1 is active.

In the ST0 and ST1 modes the SMT allots all the processor resources to one logical processor and thus guarantees a performance equivalent to that of the single thread processor. In the MT mode, on the other hand, the processor resources are shared among the two logical processors. In the MT mode, although the performance depends on the kind of software running on the logical processors, these logical processors achieve a performance of about 60% that of the single thread processor individually and, when combined, about 120%.

When a logical processor executes a HALT instruction, the SMT processor transits from the MT mode to the ST0 mode or ST1 mode, depending on which of the logical processors has executed the instruction. If the remaining active logical processor also executes the HALT instruction, the SMT processor enters a power save mode. When, during the ST0 mode or ST1 mode, a HALT exit command in the form of, for example, an external interrupt is issued to a logical processor that is at rest, the SMT processor moves to the MT mode.

A processor utilization rate needs to be measured to monitor in real time the utilization state of the computer system or to control the allocation of the processor resources according to a load.

In single threading processors, the measurement of individual processors' processor utilization rate is relatively simple. Time spent in processing can be used as is. Dividing the time that the processor has been running by an elapsed time results in the processor utilization rate for that processor being determined. Even if a plurality of software processes or threads are being executed on one processor, they are not executed simultaneously but sequentially. So, the processor utilization rate for the software processes or threads can be determined similarly with ease.

In the SMT processors, on the other hand, since a plurality of logical processors run simultaneously in one processor, the processor utilization by each logical processor cannot be determined correctly by the simple measurement of time alone. So, in the SMT processor environment it is necessary to use a method that is different from the one used on the single threading processors and which calculates an SMT-aware processor utilization by each logical processor and a processor utilization by the SMT processor as a whole.

U.S. Pat. No. 7,657,893 describes a method for measuring the processor utilization for each logical processor in an SMT processor. U.S. Pat. No. 7,555,753 describes a method for calculating the processor utilization with respect to an entire SMT processor resource in the SMT processor environment.

SUMMARY OF THE INVENTION

In an SMT processor with two logical processors, if the same line of reasoning is followed as with the single thread processor, the processor utilization for each logical processor can be determined by dividing the logical processor run time in a sample interval by an elapsed time of the sample interval. In this theory, if a logical processor 0 continues running during the sample interval during which a logical processor 1 is at rest, the processor utilization rate for the logical processor 0 and the SMT processor is 50%. This means that the SMT processor has a remaining capacity of 50%. In reality, however, since the SMT processor at this time runs in a single task mode, the processor utilization rate of the logical processor 0 and the SMT processor is 100%. It follows therefore that a calculation of the processor utilization rate based on the theory mentioned above will overly estimate the remaining capacity of the SMT processor.

A conventional method described in U.S. Pat. No. 7,657,893 periodically detects the operation state of each logical processor in the SMT processor for each processor cycle and distributes that processor cycle to the logical processor to which an instruction has been dispatched. This method is assumed to be implemented by a dedicated hardware mechanism. To realize it by software without requiring a special hardware mechanism this method poses the following problem. Since software cannot be run independently of the operation of the logical processor, the periodical detection of the logical processor operation status requires a cyclic interrupt to each of a plurality of logical processors and synchronization among them. Shortening the detection period increases accuracy but it also raises overhead caused by additional interrupts and synchronizations. Longer period, though it reduces the overhead caused by interrupts and synchronizations, lowers accuracy. So, another method is required for calculating with software the processor utilization for each logical processor in the SMT processor.

U.S. Pat. No. 7,555,753 describes a conventional method that calculates the SMT processor utilization rate for each process of an operating system by multiplying the SMT processor utilization obtained for each logical processor by the logical processor utilization rate for each process of the operating system running on the logical processor. With this method, however, the SMT processor utilization rate for each logical processor is described to be acquired by simply referencing a register of the logical processor and no detailed calculation procedure is given.

SMT processors currently in wide use mostly have two logical processors but no hardware mechanism dedicated to calculating an SMT-aware processor utilization. Under this circumstance, it would be very useful if software is available that can calculate the processor utilization for each logical processor in the SMT processor, even if it limits the number of logical processors in one SMT processor to two.

In an SMT processor with two logical processors and with two operation modes, such as a single task mode and a multitask mode, an object of this invention is to calculate online and asynchronously an SMT operation mode-aware processor utilization and an SMT-aware processor utilization rate in any sample interval and in any desired block for each logical processor, for each process of an operating system and for the SMT processor, without requiring a dedicated hardware mechanism.

In an SMT processor with two logical processors and with two operation modes, such as a single task (ST) mode and a multitask (MT) mode, the present invention provides a method for calculating online and asynchronously an SMT operation mode-aware processor utilization and an SMT-aware processor utilization rate in any sample interval and in any desired block for each logical processor, for each process of an operating system and for the SMT processor.

In this invention, one computation interval in which to calculate the processor utilization for a logical processor is assumed to be an interval of an arbitrary length during which the logical processor being calculated is active from the start of the interval to its end and which includes no state transitions to an inactive state. This computation interval is divided into an ST mode execution interval and an MT mode execution interval.

Then the MT mode execution interval multiplied by a predetermined MT mode processor resource assignment ratio is added to the ST mode execution interval to obtain the processor utilization for the logical processor in the computation interval.

An elapsed time, the ST mode execution interval and the MT mode execution interval in the computation interval are calculated as follows.

Calculations are made of the elapsed time and of an accumulated sleep duration in the computation interval for the other logical processor belonging to the same SMT processor in which the logical processor being calculated resides are calculated. Then, with the operation mode of the SMT processor taken into consideration, the accumulated sleep duration of the other logical processor, as is, is determined to be the ST mode execution interval. The ST mode execution interval subtracted from the elapsed time is determined as the MT mode execution interval. The accumulated sleep duration of the other logical processor in the computation interval is calculated as follows based on the before-and-after relation between two times.

Each of the two logical processors in the SMT processor stores its accumulated sleep duration, made up of the elapsed times from a sleep start time to a subsequent sleep exit time of the logical processor, and a most recent sleep start time and a most recent sleep exit time. These are shared by the two logical processors.

The calculation-targeted logical processor acquires a start time and an end time of the computation interval and stores them until the computation is finished.

The calculation-targeted logical processor determines a difference in the accumulated sleep duration of the other logical processor between the end time and the start time of the computation interval.

At the start of the processor utilization computation, the calculation-targeted logical processor references a most recent sleep start time and a most recent sleep exit time of the other logical processor. If the most recent sleep start time is greater than the most recent sleep exit time, the logical processor decides that the other logical processor is inactive and determines an excess of the difference, which is discrete data, to be equal to a difference between the most recent sleep start time and the computation interval start time. If the most recent sleep start time is smaller than the most recent sleep exit time, the logical processor decides that the other logical processor is active and determines the excess of the difference to be equal to zero.

At the end of the processor utilization computation, the logical processor references a most recent sleep start time and a most recent sleep exit time of the other logical processor. If the most recent sleep start time is greater than the most recent sleep exit time, the logical processor decides that the other logical processor is inactive and determines a shortage of the difference, which is discrete data, to be equal to a difference between the computation interval end time and the most recent sleep start time. If the most recent sleep start time is smaller than the most recent sleep exit time, the logical processor decides that the other logical processor is active and determines the shortage of the difference to be equal to zero.

Then, the logical processor subtracts the excess from and adds the shortage to the other logical processor's accumulated sleep duration difference to determine the accumulated sleep duration of the other logical processor in the computation interval.

In an SMT processor having two logical processors, the method of this invention allows for the computation of the processor utilization rate of each logical processor and the processor utilization rate of the SMT processor that are aware of the SMT processor's operation mode—single task mode and multitask mode—and its mode transition, without requiring a dedicated hardware mechanism. The method of this invention is characterized by an online and asynchronous computation and by a small computation volume.

The operation of correcting the accumulated data according to this invention is widely applicable to the algorithm-based computation of an utilization and a utilization rate.

Other objects, features and advantages of the invention will become apparent from the following description of the embodiments of the invention taken in conjunction with the accompanying drawings.

BRIEF DESCRIPTION OF THE DRAWINGS

FIGS. 5A and 5B are flow charts of the prior art showing procedures for calculating a processor utilization and a processor utilization rate, respectively, of a physical processor 0 when the SMT is inactive.

FIG. 7 is a configuration diagram of a processor utilization rate monitor of one embodiment of this invention.

FIG. 14 is a flow chart showing a process of updating the accumulated sleep duration of a logical processor.

DESCRIPTION OF THE EMBODIMENTS

One embodiment of this invention will be described in detail by referring to the accompanying drawings.

Figure 1:
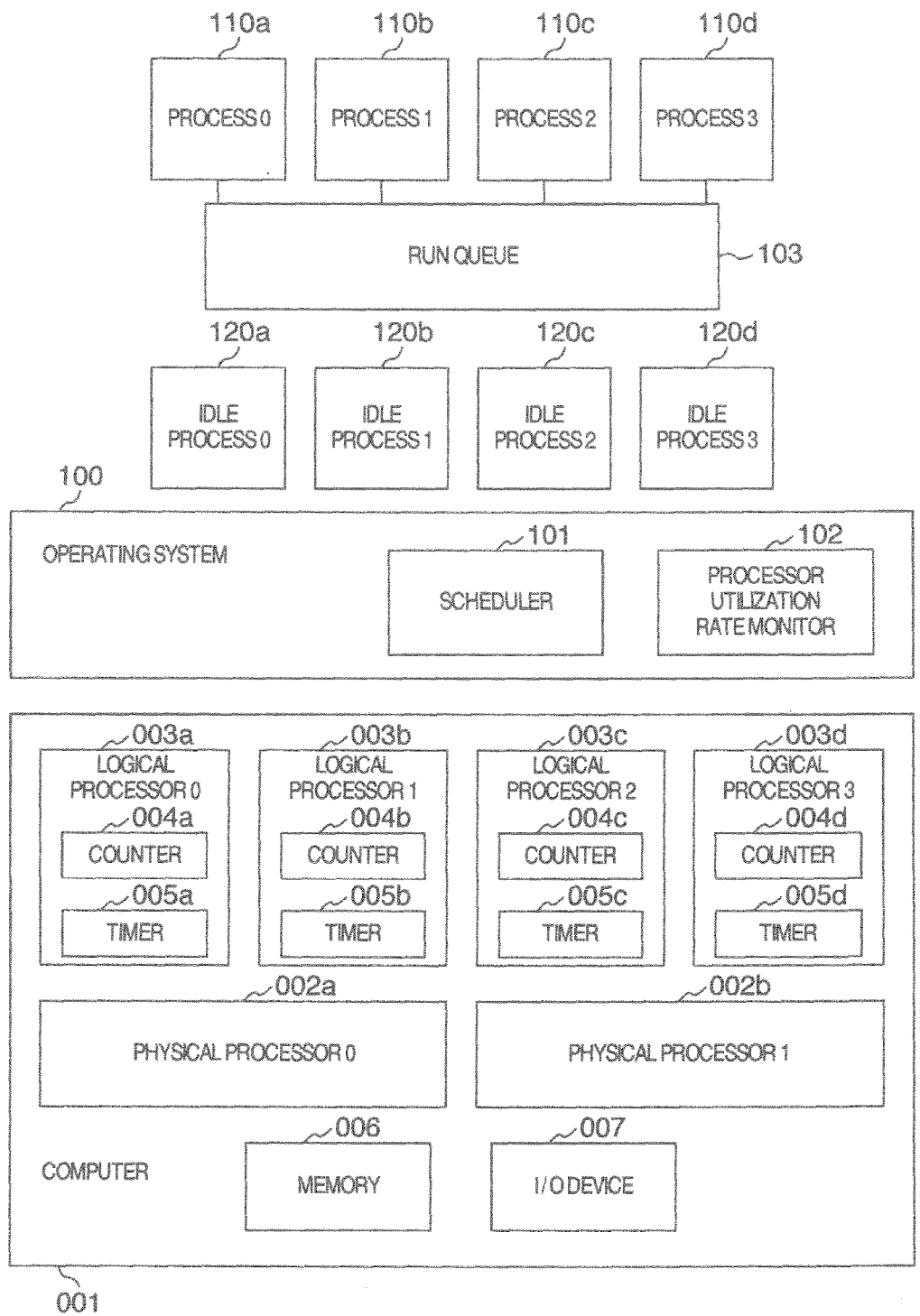
FIG. 1 is a configuration diagram showing an outline of a computer system applying the present invention.

FIG. 1 is a configuration diagram showing an outline of a computer system applying this invention. A computer 001 has a physical processor 0 (002*a*), a physical processor 1 (002*b*), a memory 006 and one or more I/O devices 007.

The physical processor 0 (002*a*) and the physical processor 1 (002*b*) each have a simultaneous multi-threading (SMT) function that allows a single physical processor to be used in two threads simultaneously so that the processor can run as two logical processors. From a viewpoint of an operating system 100, each of the threads looks a single logical processor. In this embodiment, therefore, the physical processor 0 (002*a*) is seen as a logical processor 0 (003*a*) and a logical processor 1 (003*b*), and the physical processor 1 (002*b*) is seen as a logical processor 2 (003*c*) and a logical processor 3 (003*d*).

The logical processors 0 (003*a*), 1 (003*b*), 2 (003*c*) and 3 (003*d*) have a cycle counter 004*a*, 004*b*, 004*c*, 004*d* and a timer 005*a*, 005*b*, 005*c*, 005*d*, respectively. In addition to the functions shown here, the physical processor 0 (002*a*) and the physical processor 1 (002*b*) may each have a plurality of processing mechanisms, multilevel caches and other constitutional elements. Their details do not matter in this invention. To clarify the effectiveness of this invention, this embodiment assumes that the logical processors 0 (003*a*), 1 (003*b*), 2 (003*c*) and 3 (003*d*) do not have an SMT-aware special counter.

The memory 006 is used as a volatile area for programs and data.

The I/O devices 007 includes a disk controller for operating a disk drive and a network interface for connection with external computer systems via networks. In this embodiment detailed description of the I/O devices 007 is omitted.

The characteristics of a physical processor with the SMT function made active (abbreviated an SMT processor) will be described. On the SMT processor two logical processors are active simultaneously, contending for resources available in a single physical processor. The SMT processor can improve an overall throughput of a plurality of processes through this dynamic sharing of the resource of the physical processor by a plurality of logical processors. The SMT processor can also guarantee an equivalent of a single thread physical processor not only in terms of a total performance of a plurality of processes but also for a performance of a single process.

Figure 2:
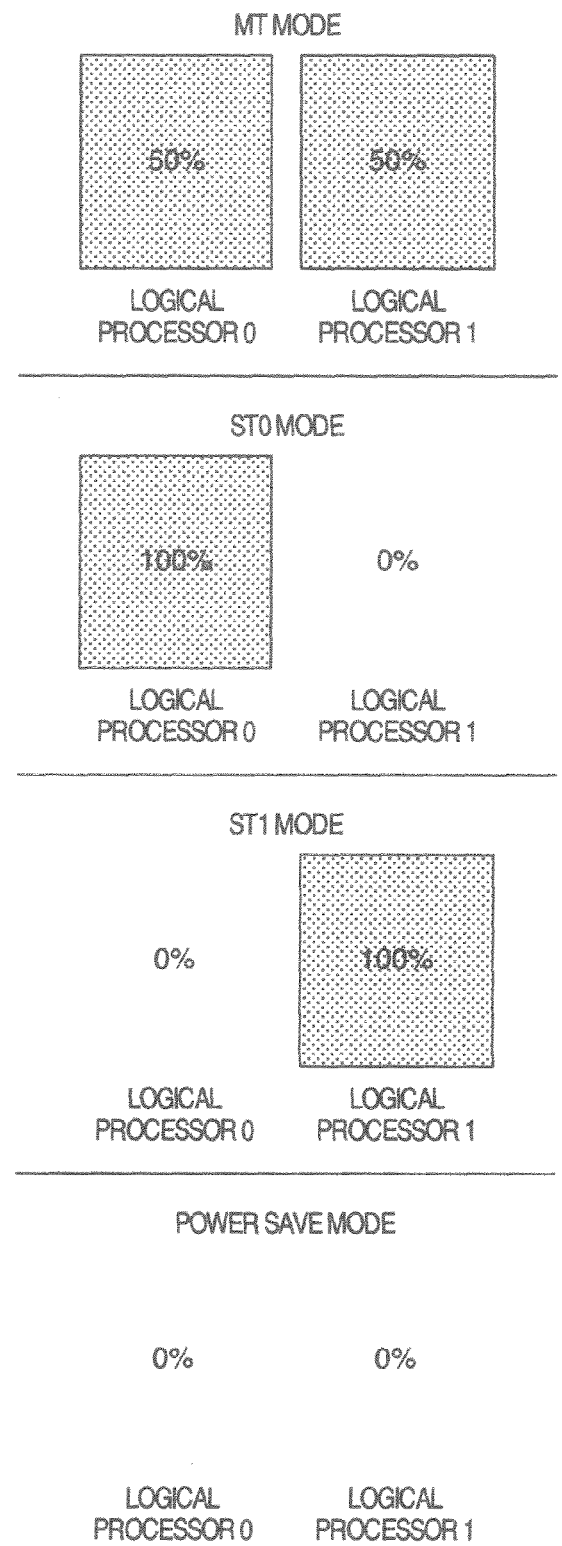
FIG. 2 is a conceptual diagram showing operation modes of an SMT processor and physical processor resource assignment ratios for logical processors in each operation mode.
Figure 3:
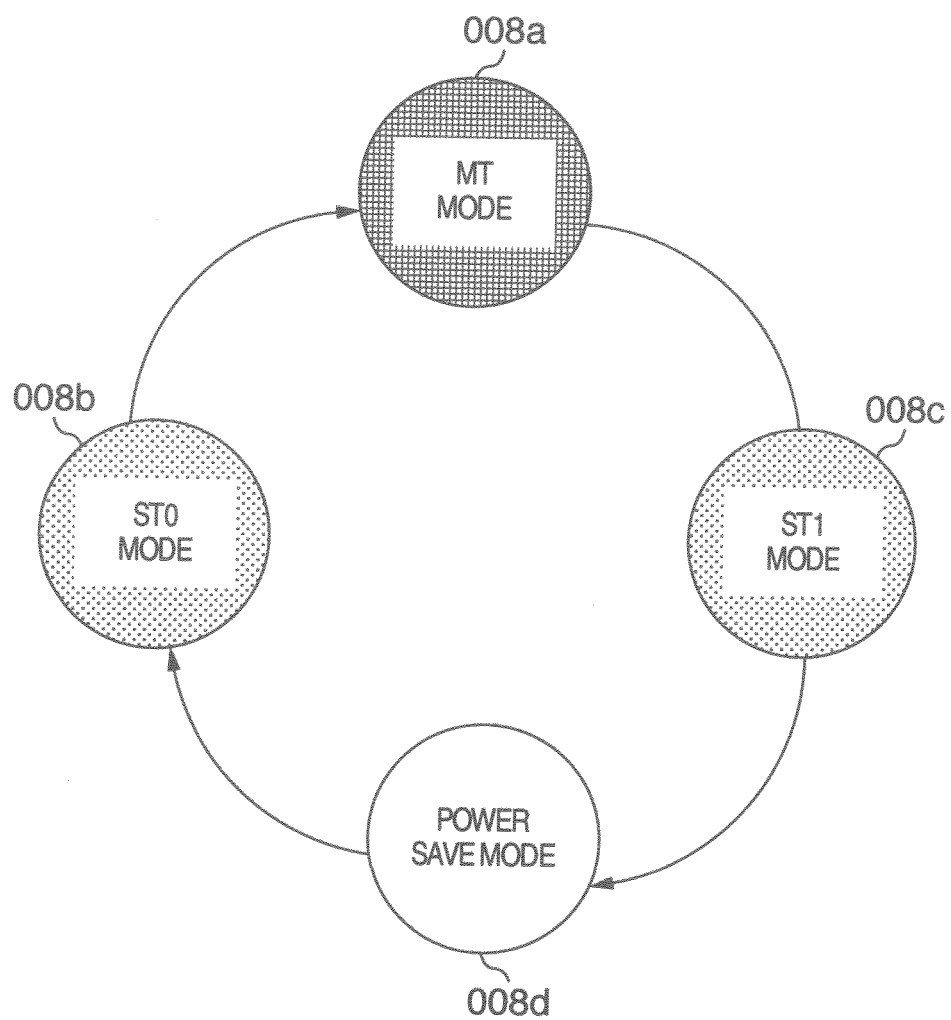
FIG. 3 is a diagram showing a transition among the operation modes of the SMT processor.

The SMT processor realizes this unique capability with a dynamic switching of operational mode. FIG. 2 is a conceptual diagram showing different operation modes of the SMT processor and a ratio of assigning the physical processor resource to logical processors in each operation mode. FIG. 3 shows an operation mode transition of the SMT processor. The physical processor 0 (002*a*) and the logical processors 0 (003*a*), 1 (003*b*) will be taken up for example.

First, the operation modes of the SMT processor will be explained. The physical processor 0 (002*a*) operates in one of two possible cases: one in which only one logical processor is active and one in which both of the two logical processors are active. In each of the cases, the physical processor 0 (002*a*) offers two operation modes: a single task (ST) mode and a multitask (MT) mode 008*a*. When none of the logic processors in the physical processor 0 (002*a*) is active, the physical processor 0 (002*a*) is in a power save mode 008*d*. The ST mode of the physical processor 0 (002*a*) is broken down into an ST0 mode 008*b* where only the logical processor 0 (003*a*) is active and an ST1 mode 008*c* where only the logical processor 1 (003*b*) is active.

In the ST mode, the entire processor resource of the physical processor 0 (002*a*) is allocated to one logical processor. That is, the physical processor resource assignment ratio for each logical processor is 100%. So, during the ST mode the SMT processor guarantees the active logical processor a performance equivalent to that of a single thread physical processor.

During the MT mode 008*a* the resource of the physical processor 0 (002*a*) is shared by the two logical processors including the logical processor 0 (003*a*) and the logical processor 1 (003*b*). In the MT mode 008*a*, the physical processor 0 (002*a*) manages its processor resource efficiently so that the unused processor resource is taken up by the two logical processors. In that case, when the two logical processors request resources, the physical processor divides its unused resource equally to prevent a situation where the processor resource is used only by one of the logical processors, brining the execution of the other logical processor to a halt. Based on this fact, the physical processor resource assignment ratio for each logical processor during the MT mode 008*a* is considered to be 50%. As to the performance of the logical processors during the MT mode 008*a*, though it depends on the kind of application running on them, approximately 60% of the performance of a single thread physical processor is realized by one logical processor and about 120% by two logical processors combined. It follows therefore that the physical processor resource assignment ratio for each logical processor during the MT mode 008a can also be considered to be 60%. Which of the assignment ratios should be adopted may be determined according to an object of use.

Next, the state transition among operation modes of the SMT processor will be explained. When, with both of the logical processors 0 (003a), 1 (003b) active, the logical processor 0 (003a) issues a HALT command, the physical processor 0 (002a) moves from the MT mode 008a to the ST1 mode 008c. If the remaining active logical processor 1 (003b) also issues a HALT command, the physical processor 0 (002a) enters the power save mode 008d. If, during the power save mode 008d, an external interrupt is issued to the logical processor 0 (003a), the physical processor 0 (002a) enters the ST0 mode 008b. When, during the ST0 mode 008b, an external interrupt is issued to the logical processor 1 (0036), the physical processor transits to the MT mode 008a.

Cycle counters 004a, 004b, 004c, 004d installed in the respective logic processors continually operate at a known predetermined frequency without stopping and are synchronized among all the logic processors. The system needs only to have at least one cycle counter as long as it satisfies the requirement of being able to operate at a known predetermined frequency without stopping. The reason that this embodiment provides one cycle counter in each logical processor is to present a typical computer applying this invention as an embodiment. This embodiment is also assumed to have no SMT-aware cycle counter, as described above. In the explanation that follows, cycle counter values are described as times for intuitive and easy understanding.

The timers 005a, 005b, 005c, 005d provided one for each of the logical processors have a function to generate an external interrupt at a specified time and, in this embodiment in particular, are used to cyclically invoke a processor utilization rate computation operation to cyclically calculate the processor utilization rate.

The operating system 100 is a system software that manages the hardware resources of the computer 001 and provides an environment in which to execute applications. The application execution environment provided by the operating system 100 is implemented as a process. In this embodiment, the operating system has, among others, a scheduler 101 and a processor utilization rate monitor 102 as its constitutional elements. The operating system 100 is placed on the memory 006.

In this embodiment, a total of four processes including process 0 (110a), process 1 (110b), process 2 (110c) and process 3 (110d) are active. These processes are entities on which to run applications by providing them with an execution environment. The operating system 100 switches over between different processes running on different logical processors to allow these processes to share the logical processors on a time-sharing basis, thereby implementing a multiprogramming environment in which a plurality of processes are simultaneously active.

The processes have their own predetermined lifetimes, which in most cases correspond to the associated applications. The processes are createdupon the launching of the associated applications and terminated at the end of the applications.

The allocation of processes among the logical processors is controlled by the scheduler 101 according to their priority. The scheduler 101 performs scheduling using a priority-conscious run-queue. The scheduler may take a variety of schemes according to the configuration and purpose of the computer system. In this embodiment, details of the implementation method is omitted.

The operating system 100 also connects an idle process 0 (120a), idle process 1 (120b), idle process 2 (120c) and idle process 3 (120d) to the logical processor 0 (003a), logical processor 1 (003b), logical processor 2 (003c) and logical processor 3 (003d), respectively.

The scheduler 101 manages processes that are not assigned to the logical processors using the run-queue. When the scheduler 101 selects a process and runs it on the logical processor, it retrieves the process from the run-queue. For stopping the execution of the process on the logical processor, the scheduler 101 cancels the assignment of the process to the logical processor and inserts it into the run-queue.

When it cannot find a process to be assigned to the logical processor, the scheduler 101 lets the corresponding idle process run on the logical processor until the desired process is found. While the idle process runs on the logical processor, the scheduler 101 always issues a HALT command to put the logical processor at rest.

While a single thread physical processor produces no big difference in performance whichever logical processor the process is assigned to, the SMT processor, as described above, can have a very large performance difference depending on the selection of the logical processor for process assignment. In a computer system with the SMT processor, it is very important to take the process scheduling into account and correctly grasp the performance difference caused by the process assignment to the logical processor. The processor utilization rate computation method of this invention does not require special hardware dedicated to SMT in calculating an SMT-aware processor utilization and utilization rate.

The processor utilization rate monitor 102 periodically collects and stores the processor utilization rate for a physical processor, for each of logical processors in the physical processor and for each process in the operating system 100. The processor utilization rate is necessary for monitoring in real time the operation status of the computer system and for controlling the assignment of the processor resource according to a load. Although the scheduler 101 can use in the process scheduling the processor utilization rates collected by the processor utilization rate monitor, since this embodiment focuses not on the use of the processor utilization rate but on the calculation of that rate, detailed description on its use is omitted here.

The processor utilization rate monitor 102 does not need to be a process but may be an external interrupt handler or a library function. In this embodiment, any desired form of implementing the processor utilization rate monitor 102 may be used.

Before proceeding to explaining the method of this invention, a conventional method of calculating the processor utilization rate when the SMT is inactive will be explained. The processor utilization rate for the physical processor 0 (002a) is taken up as an example.

Figure 4:
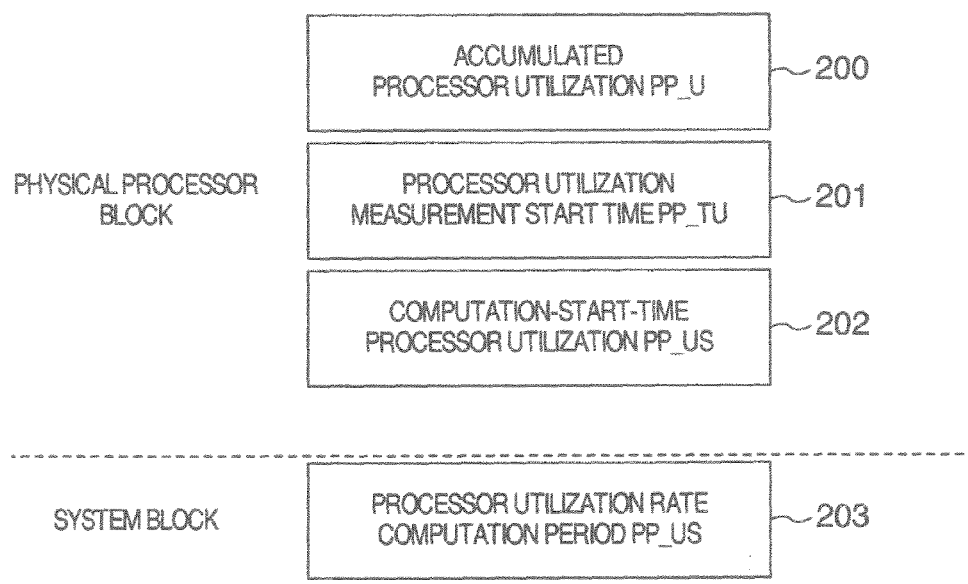
FIG. 4 is a configuration diagram of a processor utilization rate monitor of a prior art when the SMT is inactive.

FIG. 4 shows a block diagram for the processor utilization rate monitor 102 with a prior art technology when the SMT is inactive. This diagram shows only the information necessary for explanation. For the physical processor 0 (002a), the processor utilization rate monitor 102 has an an accumulated processor utilization PP_U (200), a processor utilization measurement start time PP_TU (201) and a calculation start time processor utilization PP_US (202). For the system, the processor utilization rate monitor 102 has a processor utilization rate computation period UPRD (203).

The conventional processing to calculate the processor utilization for the physical processor 0 (002a) when the SMT is inactive will be explained by referring to a flow chart of FIG. 5A. When the physical processor 0 (002a) exits an inactive or halt state and starts execution, it stores in the processor utilization measurement start time PP0_TU (201) the point in time (current time) at which the processor is started (step 301).

When it interrupts its execution and issues a HALT command to bring itself to a rest state, the physical processor 0 (002*a*) subtracts the processor utilization measurement start time PP0_TU (201) from that point in time (current time) to determine the current processor utilization as t2-PP0_TU. It then adds the current processor utilization thus obtained to the accumulated processor utilization PP0_U (200) (step 302). This operation is repeated each time the physical processor 0 (002*a*) starts and stops its execution.

By referring to a flow chart of FIG. 5B, a conventional routine to calculate the processor utilization rate by the physical processor 0 (002*a*) when the SMT is inactive will be explained. A timer is set to generate an external interrupt in every cycle of the processor utilization rate computation. The processor utilization rate computation routine in the processor utilization rate monitor 102 is called up periodically by this external interrupt as a trigger.

When a time for the processor utilization rate computation comes, a processor utilization rate computation start routine is called. The start routine retrieves the accumulated processor utilization PP0_U (200) of the physical processor 0 (002*a*) and stores it in a calculation start time processor utilization PP0_US (202) (step 303).

When the period UPRD (203) elapses and the next processor utilization rate computation time is reached, a processor utilization rate computation exit routine is called. This routine retrieves the accumulated processor utilization PP0_U (200) of the physical processor 0 (002*a*) and subtracts from it the calculation start time processor utilization PP0_US (202) to determine an increment in the processor utilization as PP0_U-PP0_US (step 304).

Dividing the increment in the processor utilization by the processor utilization rate computation period UPRD (203) determines the processor utilization rate for the physical processor 0 (step 305).

At each timer interrupt for the processor utilization rate computation, the current processor utilization rate computation exit routine and the next processor utilization rate computation start routine are called, allowing the processor utilization, rate for the physical processor 0 (002*a*) to be calculated periodically.

With the conventional method, it is simple to obtain the processor utilization and the processor utilization rate. However, when used in calculating the processor utilization and the processor utilization rate with the SMT processor active, the conventional method fails to take the SMT processor operation mode into consideration.

Figure 6A:
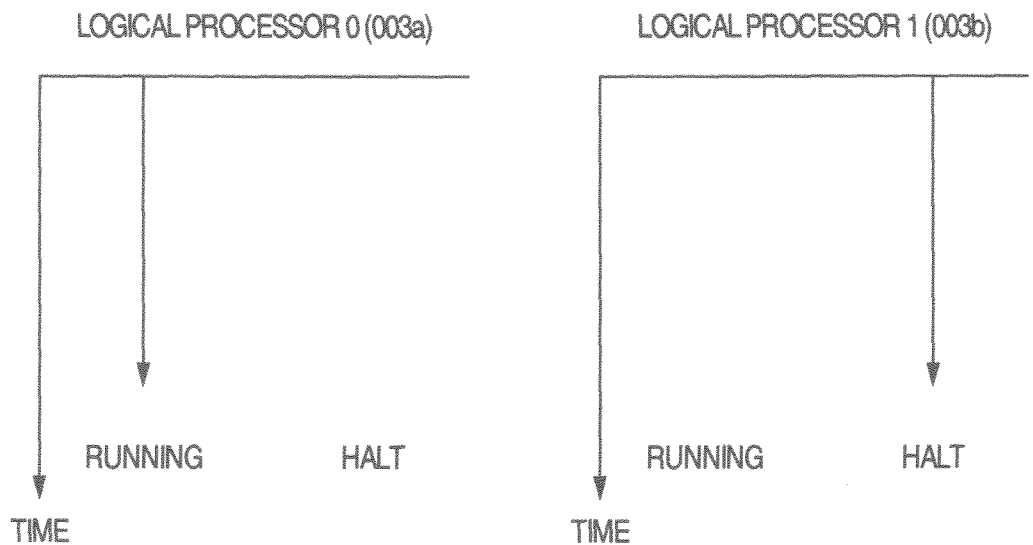
FIGS. 6A and 6B are conceptual diagrams showing operations of logical processors in the SMT processor.
Figure 6B:
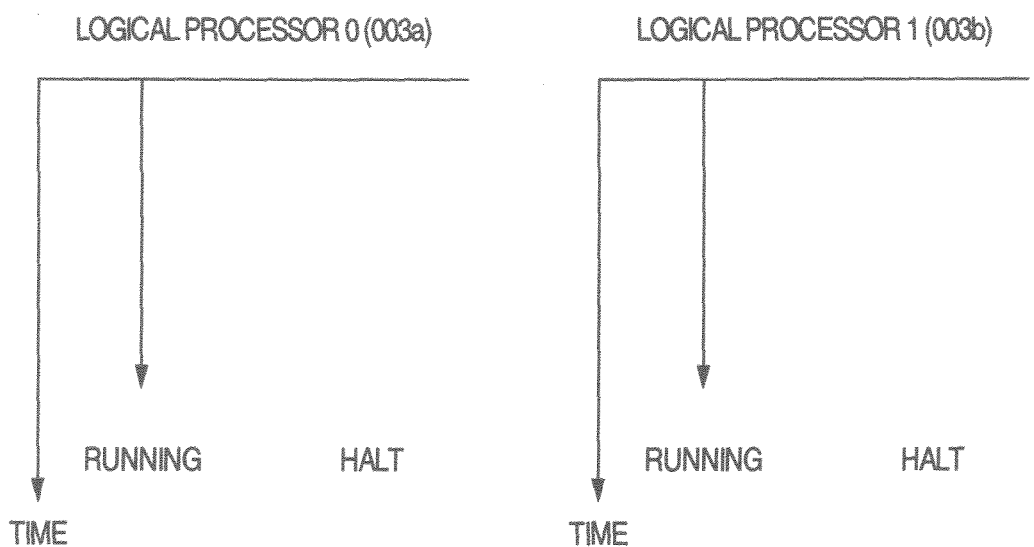

Now, the problem posed by the conventional method will be explained in by taking up an example case of determining the processor utilization rate for a logic processor. FIG. 6A is a conceptual diagram chronologically showing a state in which the logical processor 0 (003*a*) of the physical processor 0 (002*a*) is running with the other logical processor 1 (003*b*) in a sleep state. FIG. 6B chronologically shows that both of the logical processor 0 (003*a*) and the logical processor 1 (003*b*) of the physical processor 0 (002*a*) are running.

With the conventional method, the processor utilization rate for the logical processor 0 (003*a*) is 100% in both FIG. 6A and FIG. 6B. In FIG. 6A the conventional method poses no problem since the physical processor 0 (002*a*) operates in the ST mode. But in FIG. 6B since the physical processor 0 (002*a*) operates in the MT mode, the logical processor 0 (003*a*) cannot take up all the resource of the physical processor 0 (002*a*). The processor utilization rate for the logical processor 0 (003*a*) at this time should be equal to the physical processor resource assignment ratio MRTO (190) of the logical processor during the MT mode described later. This is what the method of this invention realizes.

FIG. 7 is a configuration diagram of the processor utilization rate monitor 102 in this embodiment. The processor utilization rate monitor 102 is divided into a physical processor block, a logical processor block, a process block and a system block.

For each physical processor, the processor utilization rate monitor 102 has an accumulated processor utilization PP_U (150) and a computation-start-time processor utilization PP_US (151).

For each logical processor, the processor utilization rate monitor 102 has a pointer to the other logical processor belonging to the same physical processor (160), an accumulated processor utilization LP_U (161), an accumulated run time LP-R (162), an accumulated ST mode run time LP_SR (163), a processor utilization measurement start time LP_TU (164), a computation-start-time processor utilization LP_US (165), an accumulated sleep duration LP_H (166), a most recent sleep start time LP_HS (167), a most recent sleep exit time LP_HE (168) and a current accumulated sleep duration of the other logical processor LP_HP (169).

For each process, the processor utilization rate monitor 102 has an accumulated processor utilization PR_U (180), an accumulated run time PR_R (181), an accumulated ST mode run time PR_SR (182), a processor utilization measurement start time PR_TU (183), a computation-start-time processor utilization LP_US (184) and a current accumulated sleep duration of the other logical processor LP_HP (185).

For a system, the processor utilization rate monitor 102 has a physical processor resource assignment ratio MRTO (190) of the logical processor during the MT mode and a processor utilization rate computation period UPRD (191). The physical processor resource assignment ratio MRTO (190) is set at 50% in one embodiment.

A method of calculating the processor utilization and the utilization rate of a logical processor in this embodiment will be explained by using information in FIG. 7. First, the method of this invention will be detailed referring to the chronological conceptual diagram. This is followed by the explanation of algorithm used in this method referring to a flow chart.

Figure 8:
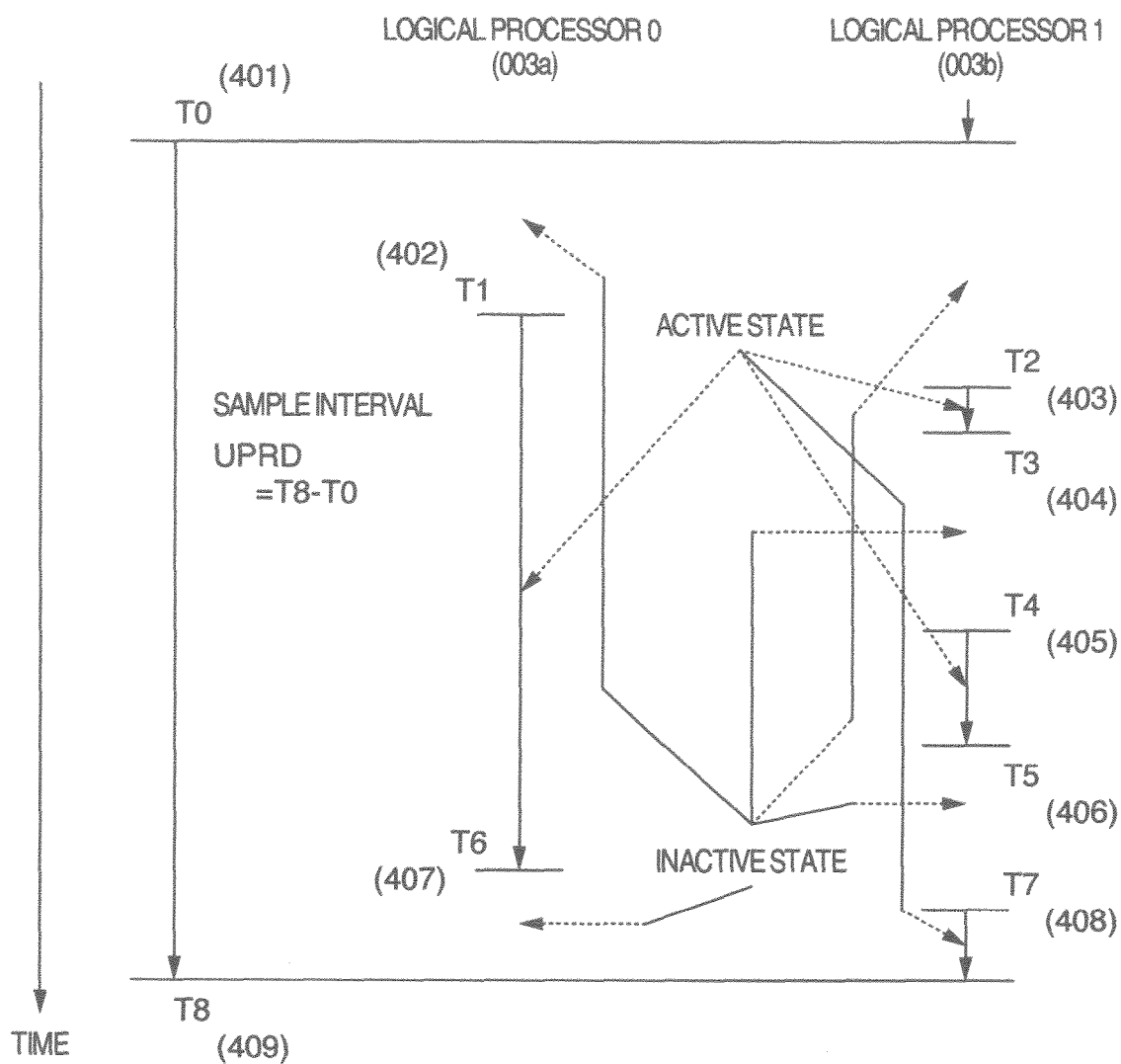
FIG. 8 is a conceptual diagram chronologically showing the operations of a logical processor 0 and a logical processor 1 of the embodiment of this invention when the physical processor 0 is SMT-active.

FIG. 8 is a conceptual diagram showing chronologically the operation of the logical processor 0 (003*a*) and the logical processor 1 (003*b*) in this embodiment when the physical processor 0 (002*a*) is SMT, active. As for the operation of the logical processor, intervals connecting different points in time represent a state where the logical processor of interest is active and blank intervals represent a state where the logical processor is at rest. The processor utilization rate R0 for the logical processor 0 (003*a*) will be determined using the method of this invention. For clear understanding of the method of this invention, a complex example is used here.

In FIG. 8, a time interval UPRD (=T8−T0) from time T0 (401) to time T8 (409) is taken as a sample interval for which the processor utilization rate is to be calculated. Both of the logical processor 0 (003*a*) and the logical processor 1 (003*b*) are in the halt state, and the physical processor 0 is in a power save mode 008*d*, the logical processor 1 (003*b*) enters its halt state at this time. That is, at time T0 (401) the logical processor 0 (003*a*) is at rest and the other logical processor 1 (003*b*) that has been running enters its halt state. At this point both of the logical processors are in the halt state, so the physical processor 0 (002*a*) enters a power save mode 008*d*. Then, when at time T1 (402) the logical processor 0 (003*a*) exits the halt state, the physical processor 0 (002*a*) enters an ST0 mode 008*b*. Next, when the logical processor 1 (003*b*) exits the halt state at time T2 (403), the physical processor 0 (002*a*) moves to the MT mode 008*a*. At time T3 (404) the logical processor 1 (003*b*) again enters the halt state, at which time the physical processor 0 (002*a*) moves to the ST0 mode 008*b*. When at time T4 (405) the logical processor 1 (003*b*) exits the halt state, the physical processor 0 (002*a*) enters the MT mode 008*a*. When at time T5 (406) the logical processor 1 (003*b*) enters the halt state, the physical processor 0 (002*a*) moves to the ST0 mode 008*b*. Then at time T6 (407) when the logical processor 0 (003*a*) halts, the physical processor 0 (002*a*) again enters the power save mode 008*d*. Then when at time T7 (408) the logical processor 1 (003*b*) exits the halt state, the physical processor 0 (002*a*) moves to the ST1 mode 008*c*. At time T8 (408) the sample interval ends.

The processor utilization U0 by the logical processor 0 (003*a*) will be determined. The run time TR0 of the logical processor 0 (003*a*) from time T1 (402) to time T6 (407) is given by:

$$TR0 = T6 - T1 \tag{1}$$

With the method of this invention, the processor utilization U0 by the logical processor 0 (003*a*) can be calculated by dividing the run time TR0 of the logical processor 0 (003*a*) into the ST mode run time TS0 and the MT mode run time TM0, multiplying the MT mode run time TM0 by the physical processor resource assignment ratio MRT0 (190) of the logical processor during the MT mode, and adding this multiplied value to the ST run time TS0. The processor utilization U0 is expressed as $$U0 = TS0 + TM0 \times MRTO \tag{2}$$

In the sample interval the logical processor 0 (003*a*) ran only once without a stop, so that the processor utilization rate R0 for the logical processor 0 (003*a*) can be determined easily by dividing the processor utilization U0 by the time UPRD (191), as given by $$R0 = U0/UPRD \tag{3}$$

Considering the operation mode of the physical processor 0 (002*a*), the ST mode run time TS0 can be regarded as being equal to a total halt time of the logical processor 1 (003*b*) within the run time of the logical processor 0 (003*a*), TH1. That is, $$TS0 = TH1 \tag{4}$$

The MT mode run time TM0 of the logical processor 0 (003*a*) does not include any halt time in the run time TR0 and therefore can be determined by subtracting the ST mode run time TS0 from the run time TR0, as given by $$TM0 = TR0 - TS0 \tag{5}$$

Using Equations (1), (4) and (5), the processor utilization U0 by the logical processor 0 (003*a*) can also be expressed as follows.

$$U0 = TH1 + ((T6 - T1) - TH1) \times MRTO \tag{6}$$

Equation (6) shows that the calculation of the total halt time TH1 of the logical processor 1 (003*b*) in the run time of the logical processor 0 (003*a*) forms a core in determining the processor utilization rate R0 for the logical processor 0 (003*a*).

The logical processor 0 (003*a*) cannot directly know whether the logical processor 1 (003*b*) is active or inactive. The logical processor 1 (003*b*) may repeat transition many times between the active state and the inactive state within an interval of interest. So, to determine the total halt time TH1 of the logical processor 1 (003*b*) requires a cooperation between the logical processor 0 (003*a*) and the logical processor 1 (003*b*).

The total halt time TH1 of the logical processor 1 (003*b*) within the run time of the logical processor 0 (003*a*) from T1 (402) to T6 (407) is given by $$TH1 = (T2 - T1) + (T4 - T3) + (T6 - T5) \tag{7}$$

To determine the total halt time TH1, it is necessary to acquire these times by referring to the cycle counter at least six times, from T1 (402) to T6 (407). Of these, T1 (402) and T6 (407) represent the start and end of the running of the logical processor 0 (003*a*) and can be acquired by simply referencing the cycle counter of the logical processor 0 (003*a*), which does not require a synchronization between the logical processor 0 (003*a*) and the logical processor 1 (003*b*).

However, times T2 (403), T3 (404), T4 (405) and T5 (406) represent the starts and ends of the other logical processor 1 (003*b*). The logical processor 0 (003*a*) cannot directly know these times. For the logical processor 0 (003*a*) to know these times, therefore, they need to be communicated from the logical processor 1 (003*b*) or polled by the logical processor 0 (003*a*).

A single run time TR0 of the logical processor 0 (003*a*), however, can be very short. The logical processor 1 (003*b*) may also halt more frequently than three times, the total number of times that the logical processor 1 (003*b*) has slept in this example as represented by the durations T0 (401)-T2 (403), T3 (404)-T4 (405) and T5 (406)-T7 (408). Furthermore, the duration of individual halts, (T2-T0), (T4-T3) and (T7-T5), can be very short. The synchronization required by polling and by the communication between logical processors, when executed highly frequently, can cause a very large overhead to applications running on the logical processor.

In practical application, therefore, the communication from the logical processor 1 (003*b*) or the polling by the logical processor 0 (003*a*) cannot be used in calculating the total halt time of the logical processor 1 (003*b*). This means that the total halt time TH1 of the logical processor 1 (003*b*) cannot be determined simply by the above Equation (7). Some provisions must be made.

Figure 9:
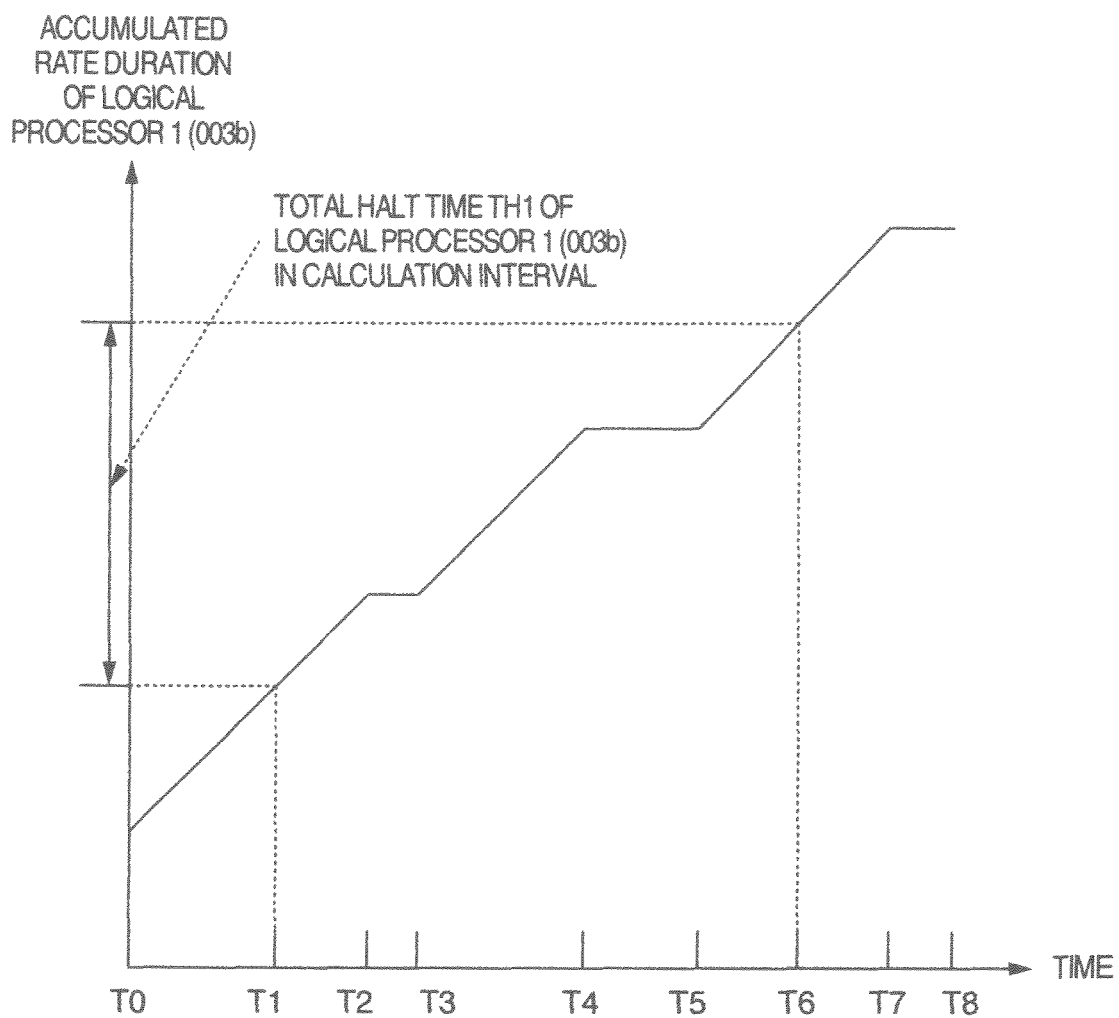
FIG. 9 is a graph chronologically showing an increase in an accumulated sleep duration of the logical processor 1.

FIG. 9 is a graph chronologically showing a progressive increase in the accumulated sleep duration of the logical processor 1 (003*b*). The accumulated sleep duration changes as shown in FIG. 9 as it is continuously updated following the operation of the logical processor 1 (003*b*). Now, let us consider a method for the logical processor 0 (003*a*) to determine TH1 of FIG. 9.

Figure 10:
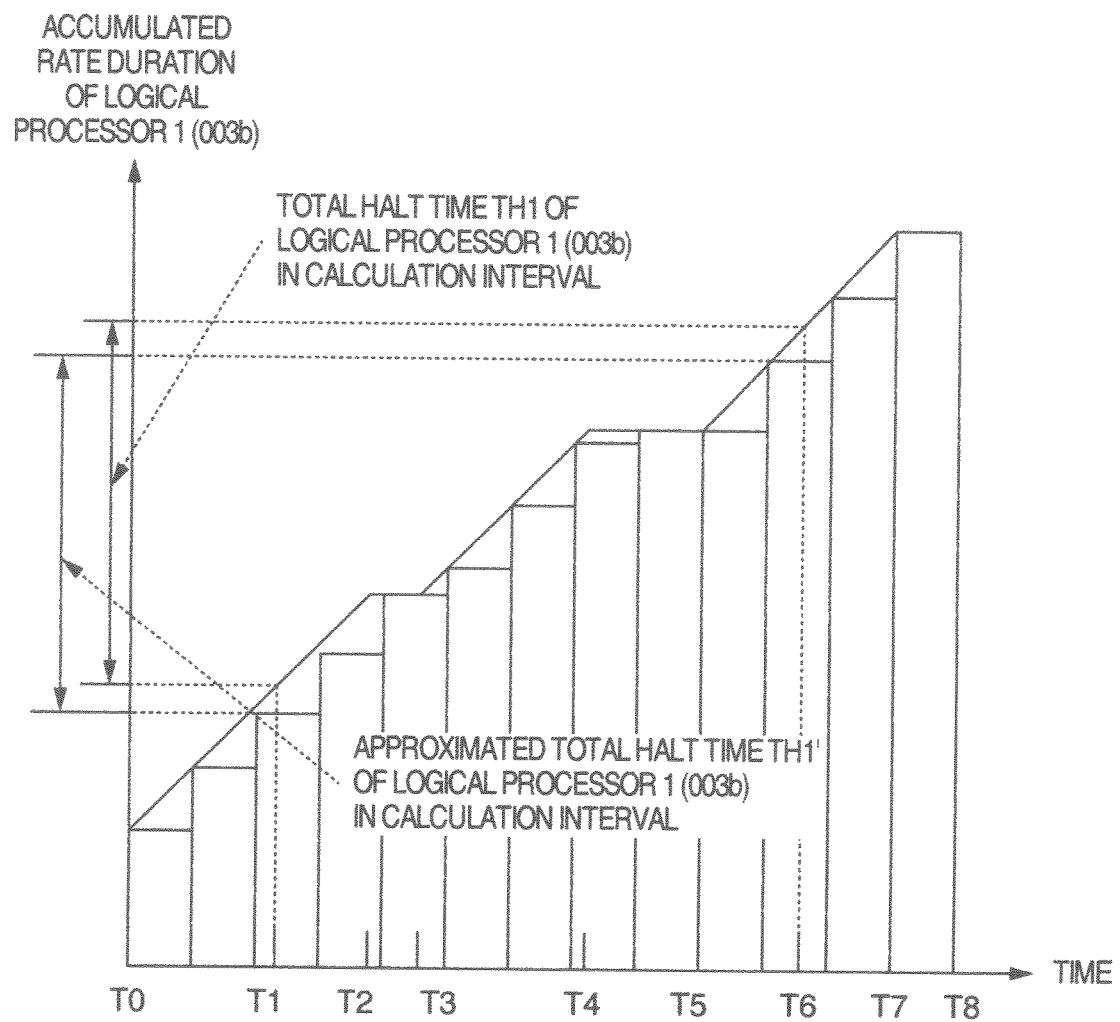
FIG. 10 is a conceptual diagram showing how the logical processor 1 updates its accumulated sleep duration at predetermined time intervals.

First, as shown in FIG. 10, one of the conceivable methods is to have the logical processor 1 (003*b*) update its accumulated sleep duration at predetermined intervals. With this approach, since the logical processor 1 (003*b*) periodically updates its own accumulated sleep duration, the logical processor 0 (003*a*) can obtain an approximation TH1' of the total halt time TH1 of the logical processor 1 (003*b*) by referencing the accumulated sleep duration of the logical processor 1 (003*b*) when the logical processor 0 (003*a*) starts and ends its operation at time T1 (402) and time T6 (407), respectively, and calculating a difference between the accumulated sleep durations.

For higher precision of this approximation, the update interval of the accumulated sleep duration needs to be shortened. And for the logical processor 1 (003*b*) in a sleep state to update the accumulated sleep duration, it needs to be waked up before it can perform any update operation. Waking the logical processor 1 (003*b*), however, causes the physical processor 0 (002*a*) to transit from the ST0 mode 008*b* to the MT mode 008a, degrading the performance of the physical processor 0 (002a). Longer update intervals of the accumulated sleep duration, on the other hand, result in too low an approximation precision for practical use. This means another method needs to be found.

Figure 11:
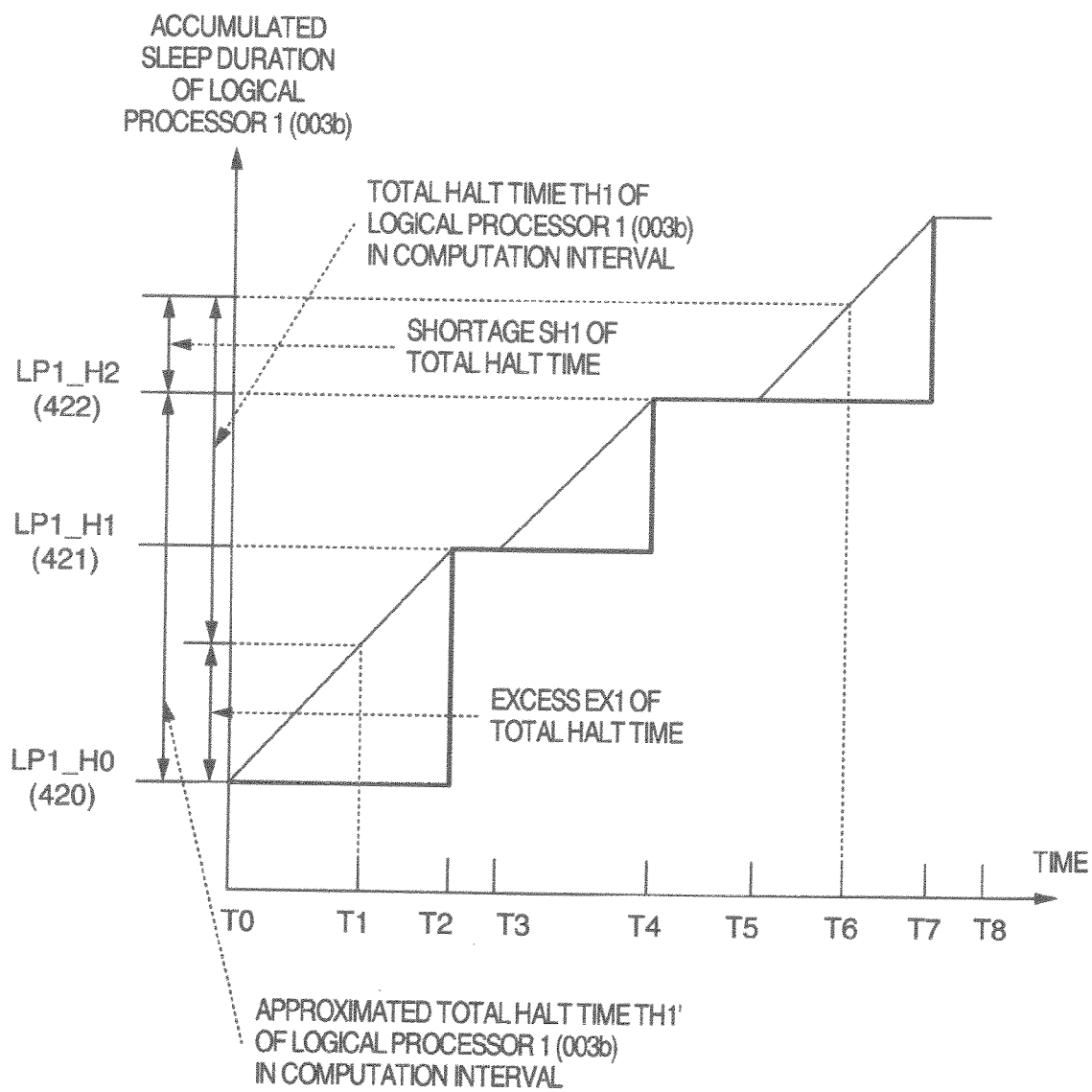
FIG. 11 is shows a method of updating the accumulated sleep duration only when the logical processor exits its sleep state or inactive state.

FIG. 11 shows a method of updating the accumulated sleep duration only when the logical processor 1 (003b) ends its sleep or halt state. With this method, the logical processor 0 (003a) acquires, at time T2 (403), an accumulated sleep duration LP1_H0 (420) up to one sleep before the last that began from time T0 (401) and, at time T6 (407), an accumulated sleep duration LP1_H2 (422) up to the sleep that ended at time T4 (405). Then the logical processor 0 (003a) can obtain a difference between the two accumulated sleep durations, TH1', as an approximation of the total halt time TH1 of the logical processor 1 (003b). The approximated total halt time THY is expressed as $$TH1'=LP1\_H2-LP1\_H0 \quad (8)$$

The method in FIG. 11 has no such problems as the one experienced in FIG. 10 or the one posed by the synchronization between the logical processor 0 (003a) and the logical processor 1 (003b). Further, the computation volume is very small. However, it still has a problem. TH1' of Equation (8) can be rewritten like Equation (7) as follows.

$$TH1'=(T2-T0)+(T4-T3) \quad (9)$$

Comparison between Equation (7) and Equation (9) shows that the approximated value TH1' exceeds the actual value TH1 at one end by EX1=(T1-T0) and is shorter at the other by SH1=(T6-T5). If the excess EX1 and the shortage SH1 can be corrected, the method of FIG. 11 can determine the total halt time TH1 of the logical processor 1 (003b) by performing only a small volume of computation without having to establish synchronization.

Looking at the excess EX1 and the shortage SH1, it is seen that the times T1 (402) and T6 (407), or minuends, are both event times of the logical processor 0 (003a) for which the processor utilization is to be calculated and that the times T0 (401) and T5 (406), or subtracters, are both event times of the logical processor 1 (003b) for which the total halt time is to be calculated. The time T1 (402) is a processor utilization computation start time for the logical processor 0 (003a) and the time T6 (407) a processor utilization computation end time. On the other hand, the time T0 (401) and the time T5 (406) are sleep start times of the logical processor 1 (003b). If the logical processor 1 (003b) records the times T0 (401) and T5 (406) in a way that allows the logical processor 0 (003a) to reference them, the logical processor 0 (003a) can determine the excess EX1 and the shortage SH1. This is what the method of this invention realizes.

Figure 12:
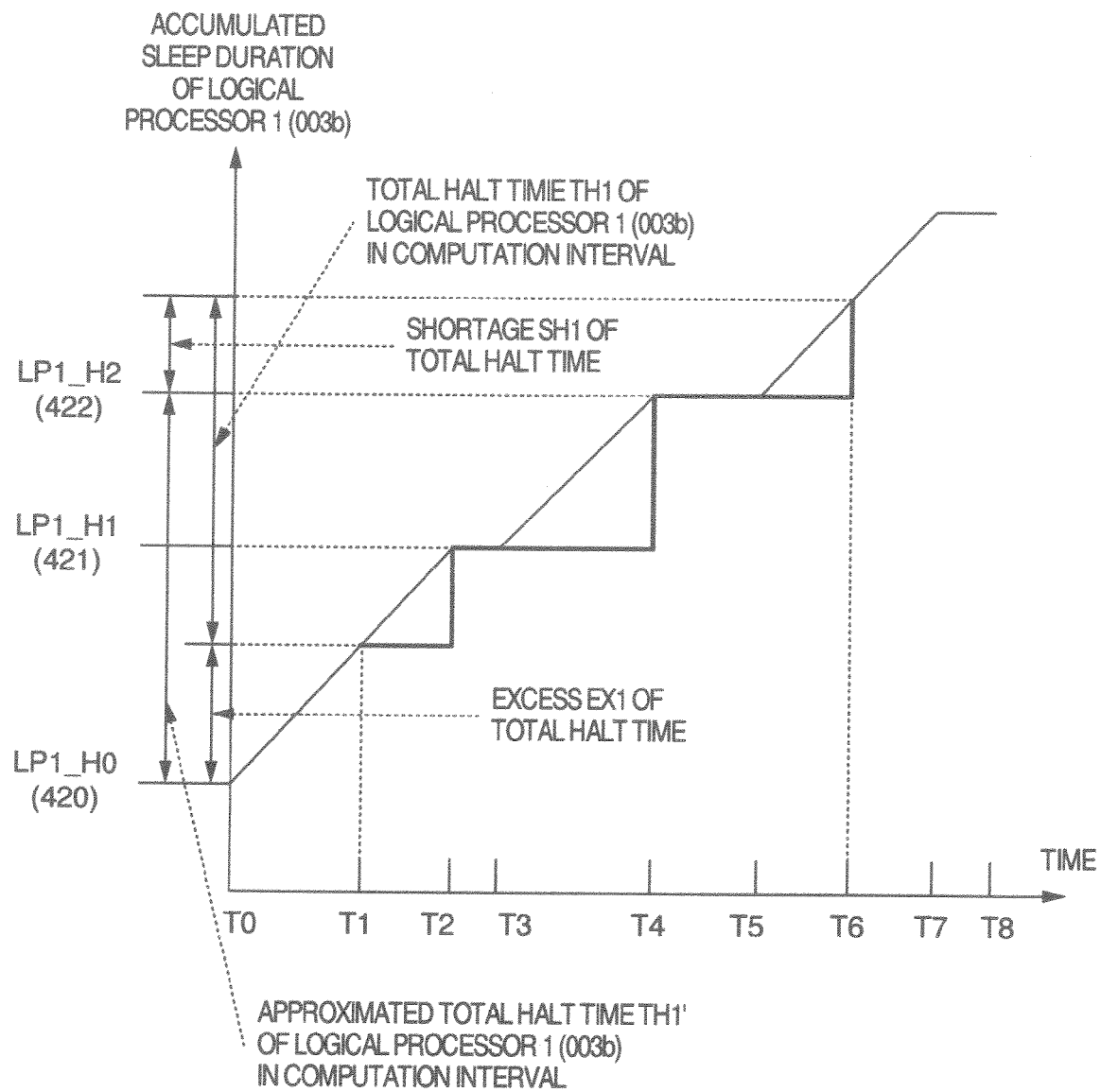
FIG. 12 is a conceptual diagram showing how the logical processor 1 updates its accumulated sleep duration only when it exits the sleep state, and records its sleep start time and sleep exit time so that the logical processor 0 can reference them.

FIG. 12 shows a method for updating the accumulated sleep duration only when the logical processor 1 (003b) ends its sleep state and for recording the sleep start time and the sleep exit time of the logical processor 1 (003b) in a way that allows the logical processor 0 (003a) to reference them.

The logical processor 0 (003a) calculates the approximation TH1' of the total halt time TH1 of the logical processor 1 (003b) by Equation (8) at the end of calculation of the processor utilization U0. At the start of calculating the processor utilization U0, the logical processor 0 (003a) also determines the excess EX1 of the approximated total halt time TH1' and, at the end of the utilization computation, determines the shortage SH1. In summary, the total halt time TH1 of the logical processor 1 (003b) can be obtained as follows.

$$TH1 = TH1' - EX1 + SH1$$
$$= (T3-T1)+(T5-T4)-(T2-T1)+(T7-T6)$$
$$= (T3-T2)+(T5-T4)+(T7-T6)$$

Once the total halt time TH1 of the logical processor 1 (003b) is obtained, the processor utilization U0 on the part of the logical processor 0 (003a) can be determined from Equation (6). Then the processor utilization rate R0 for the logical processor 0 (003a) can be determined from Equation (3).

For the method shown in FIG. 12 to be used in calculating the processor utilization, a problem needs to be solved that the excess EX1 and the shortage SH1 may not always occur, i.e., they may be 0. So, a decision needs to be made on whether there are the excess EX1 and shortage SH1. Processing to determine the presence or absence of the excess EX1 and the shortage SH1 will be explained below.

Figure 13A:
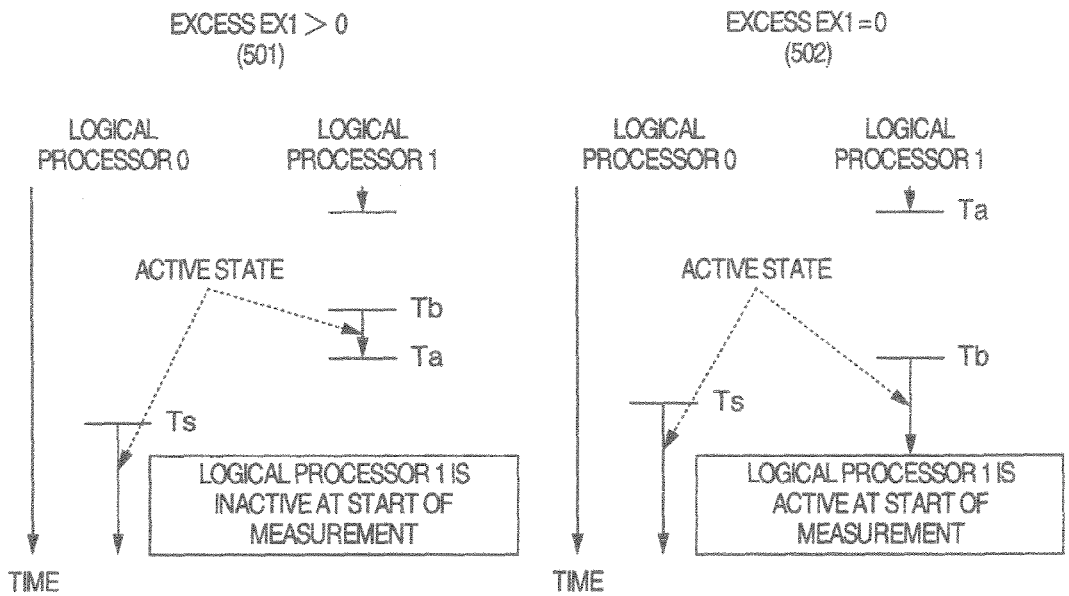
FIGS. 13A and 13B are conceptual diagrams showing a relation between the presence or absence of an excess and a shortage of the accumulated sleep duration and event times of the logical processor 0 and the logical processor 1.

FIG. 13A chronologically shows a relation between the presence or absence of the excess EX1 and event times of the logical processor 0 (003a) and the logical processor 1 (003b).

If, at the processor utilization computation start time Ts for the logical processor 0 (003a), the most recent sleep start time Ta of the logical processor 1 (003b) is greater than its most recent sleep exit time Tb, as shown in (501), the logical processor 1 (003b) is in a halt state and EX1=Ts-Ta represents the excess for the total halt time TH1.

If, on other hand, at the processor utilization computation start time Ts for the logical processor 0 (003a) the most recent sleep start time Ta of the logical processor 1 (003b) is smaller than its most recent sleep exit time Tb, as shown in (502), the logical processor 1 (003b) is running and the excess EX1 is 0.

Figure 13B:
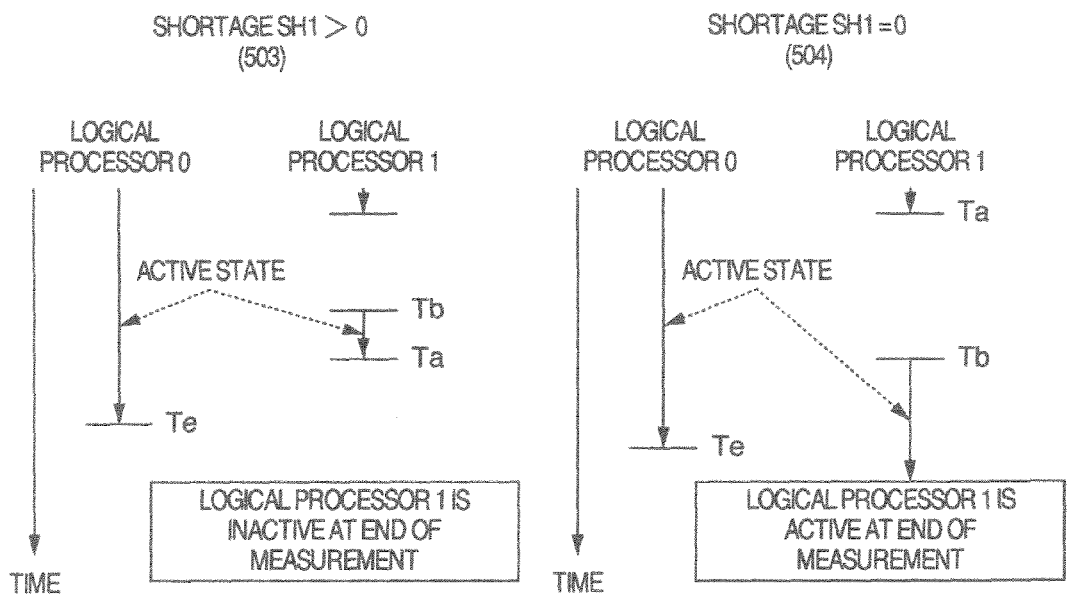

FIG. 13B shows the presence or absence of the shortage SH1 and a chronological event time relation between the logical processor 0 (003a) and the logical processor 1 (003b).

If, at the processor utilization computation end time Te, the most recent sleep start time Ta of the logical processor 1 (003b) is greater than the most recent sleep exit time Tb, as shown in (503), the logical processor 1 (003b) is inactive and SH1=Te-Ta represents the shortage for the total halt time TH1.

If, on the other hand, at the processor utilization computation end time Te the most recent sleep start time Ta of the logical processor 1 (003b) is smaller than the most recent sleep exit time Tb, as shown in (504), the logical processor 1 (003b) is active and the shortage SH1 is 0.

A method for calculating the processor utilization and processor utilization rate for the logical processor that takes into account the decision conditions of FIG. 13A and FIG. 13B in addition to the basic procedure of FIG. 12 will be explained as follows.

The procedure for calculating the processor utilization and processor utilization rate for the logical processor comprises largely an accumulated sleep duration update process by a logical processor, an accumulated processor utilization update process by a logical processor and the processor utilization rate computation process by a logical processor.

The accumulated sleep duration update process by a logical processor will be explained by referring to the flow chart of FIG. 14. The logical processor 0 (003a) in the physical processor 0 (002a) is taken up as an example.

At the sleep start time, the logical processor 0 (003a) acquires the current time t0 and stores it in the most recent sleep start time LP_HS (167) (step 601).

At the end of the sleep the logical processor 0 (003a) acquires the current time and stores it in the most recent sleep exit time LP_HE (168) (step 602).

Then, the logical processor 0 (003a) adds LP0_HE−LP0_HS to the accumulated sleep duration LP0_H (166) (step 603).

Figure 15:
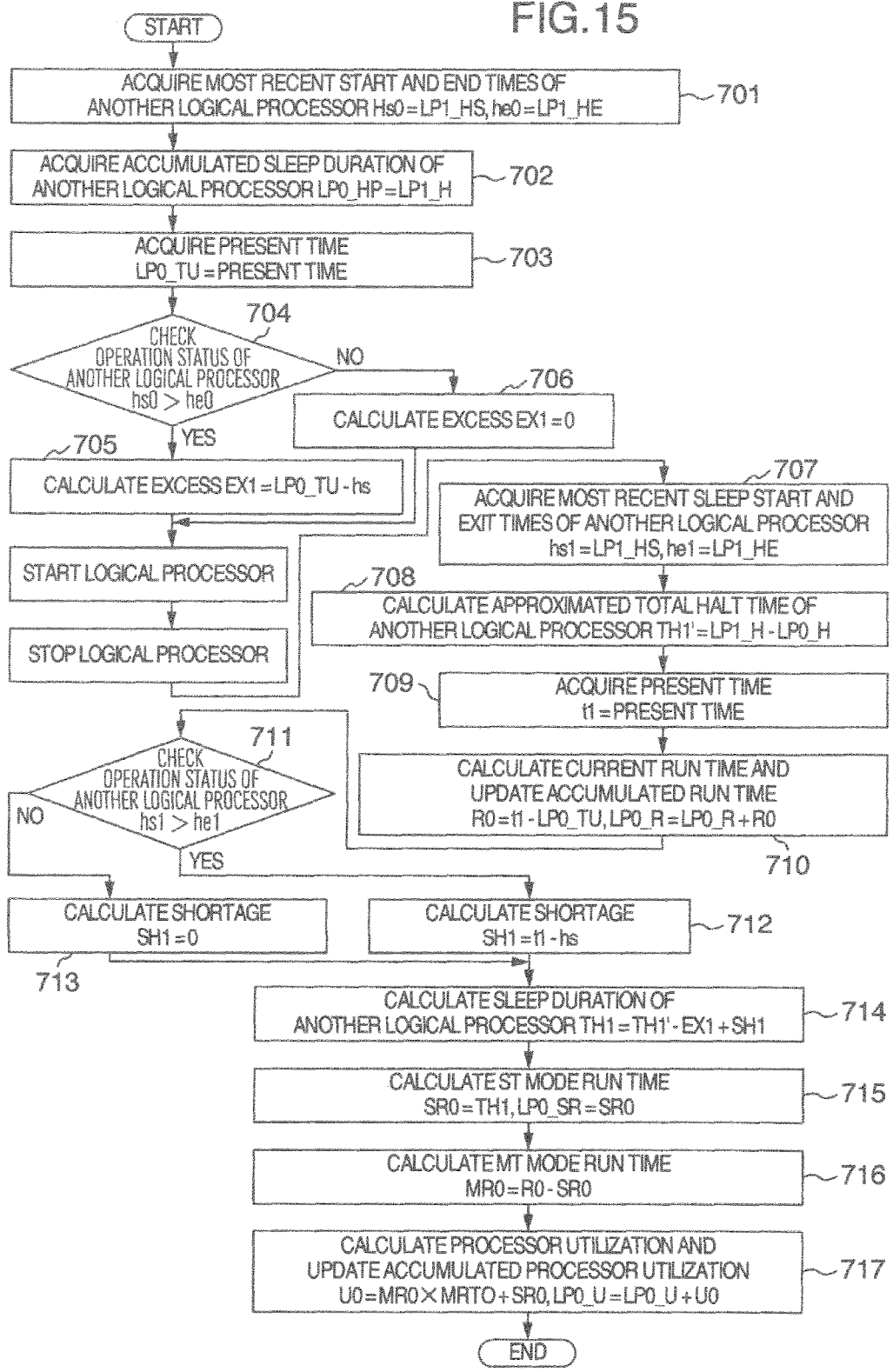
FIG. 15 is a flow chart showing a process of updating the accumulated processor utilization for a logical processor.

The accumulated processor utilization update process by the logical processor will be explained by referring to a flow chart of FIG. 15. The logical processor 0 (003a) of the physical processor 0 (002a) is taken up for an example.

The logical processor 0 (003a), when it begins to run, acquires the most recent sleep start time LP1_HS (167) and the most recent sleep exit time LP1_HE (168) of the logical processor 1 (003b) and stores them in hs0 and he0 (step 701).

At this time, in locating the logical processor 1 (003b) the logical processor 0 (003a) uses a pointer, provided in each logical processor, to the other logical processor (160) belonging to the same physical processor. Next, It acquires the accumulated sleep duration LP1_H (166) of the logical processor 1 (003b) and stores it in the current accumulated sleep duration of the other logical processor LP0_HP (169) (step 702).

Next, the logical processor 0 (003a) acquires the present time and stores it in its processor utilization measurement start time LP0_TU (164) (step 703).

The logical processor 0 (003a) then determines the excess EX1 of the approximated total halt time THY of the logical processor 1 (003b) and compares hs0 and he0 obtained earlier to decide on the operation state of the other logical processor (step 704).

If hs0 is greater than he0, it is decided that the logical processor 1 (003b) is in the sleep state and determines the excess EX1 to be t0-hs1 (step 705).

If hs0 is smaller than he0, the logical processor 0 (003a) decides that the logical processor 1 (003b) is running and determines the excess EX1 to be 0 (step 706).

Then the logical processor 0 (003a) starts running.

At the end of its running, the logical processor 0 (003a) acquires the most recent sleep start time LP1_HS (167) and the most recent sleep exit time LP1_HE (168) of the logical processor 1 (003b) and stores them in hs1 and he1 (step 707).

The logical processor 0 (003a) acquires the accumulated sleep duration LP1_H (166) of the logical processor 1 (003b) and determines a difference between it and the stored, current accumulated sleep duration of the other logical processor LP0_HP (169), or LP1_H−LP0_HP, as the approximated total halt time TH1' of the logical processor 1 (003b) (step 708).

Next, the logical processor 0 (003a) acquires the present time and stores it in t1 (step 709).

Then, it determines the current run time R0 of the logical processor 0 (003a) to be t1-LP0_TU and adds it to the accumulated run time LP0_R of the logical processor 0 (003a) (step 710).

The logical processor 0 (003a) then determines the shortage SH1 of the approximated total halt time TH1' of the logical processor 1 (003b) and compares hs1 and he1 to check the operation status of the other logical processor (step 711).

If hs1 is greater than he1, the logical processor 0 (003a) decides that the logical processor 1 (003b) is at rest and determines the shortage SH1 to be t1-hs1 (step 712).

If hs1 is found to be smaller than he1, the logical processor 0 (003a) decides that the logical processor 1 (003b) is running and determines the shortage SH1 to be 0 (step 713).

Then the logical processor 0 (003a) determines the total halt time TH1 of the logical processor 1 (003b) to be TH1'−EX1+SH1 (step 714).

The total halt time TH1 of the logical processor 1 (003b) is used, as is, as a current ST mode run time SR0 of the logical processor 0 (003a). The SR0 is then added to the accumulated ST mode run time LP0_SR (163) (step 715).

A current MT mode run time MR0 of the logical processor 0 (003a) is determined as R0-SR0 (step 716).

Then, using the physical processor resource assignment ratio MRTO (190), the logical processor 0 (003a) determines its current processor utilization U0 to be MR0×MRTO+SR0 and adds it to its accumulated processor utilization LP0_U (161) (step 717).

Figure 16:
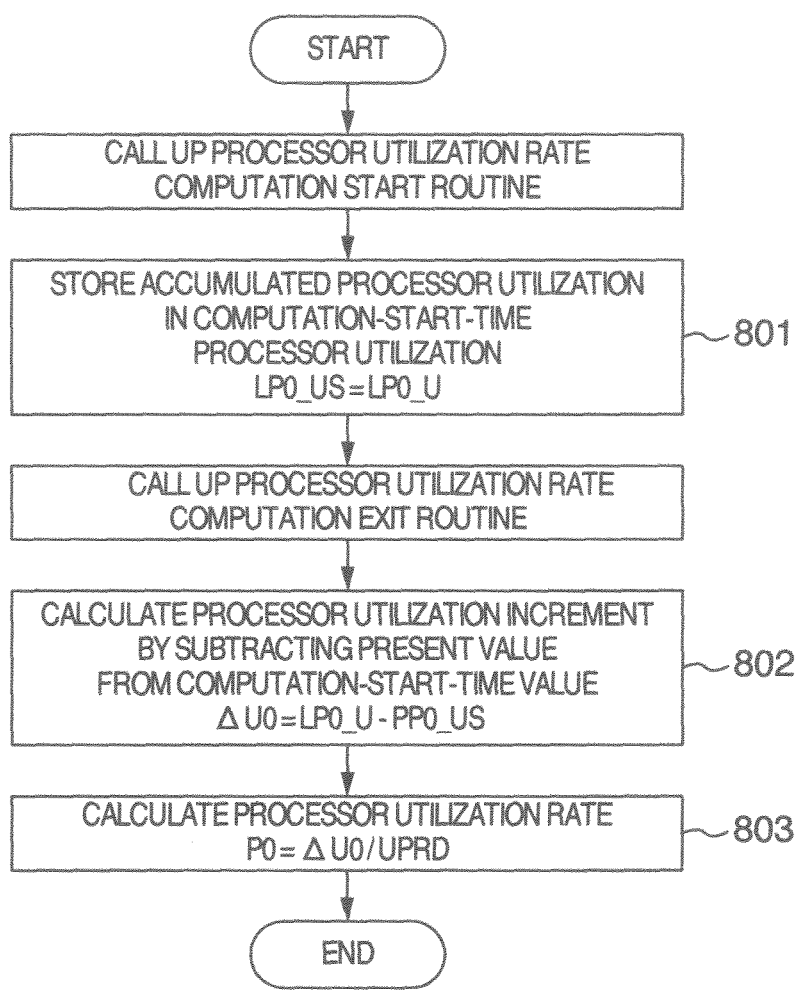
FIG. 16 is a flow chart showing a process of computing the processor utilization rate for a logical processor.

The processor utilization rate computation process performed by a logical processor will be explained by referring to a flow chart of FIG. 16. The logical processor 0 (003a) of the physical processor 0 (002a) is taken for example. A timer is so set that it generates an external interrupt at each processor utilization rate computation period UPRD (191). So, the processor utilization rate computation process is cyclically called from the processor utilization rate monitor by this external interrupt as a trigger.

When the processor utilization rate computation time arrives, the processor utilization rate computation start routine is called up. This process acquires the accumulated processor utilization LP0_U (161) and stores it in the computation-start-time processor utilization LP0_US (165) (step 801).

When, with the elapse of a period UPRD (191), the next processor utilization rate computation time is reached, a processor utilization rate computation exit routine is called. This routine retrieves the accumulated processor utilization LP0_U (161) of the logical processor 0 (003a) and subtracts from it the computation-start-time processor utilization LP0_US (165) to determine an increment ΔU0 in the processor utilization as LP0_U−LP0_US (step 802).

Dividing the increment ΔU0 in the processor utilization by the processor utilization rate computation period UPRD (191) can determine the processor utilization rate P0 for the logical processor 0 (003a) (step 803).

At each timer interrupt for the processor utilization rate computation routine, the current processor utilization rate computation exit routine and the next processor utilization rate computation start routine are called successively. This allows for a periodical calculation of the processor utilization rate for the logical processor 0 (003a).

So far, we have explained the method of calculating the processor utilization and the processor utilization rate for a logical processor. The processor utilization and the processor utilization rate for an SMT processor, i.e., those of a physical processor when the SMT is active, can be determined easily adding the processor utilizations and the processor utilization rates for two logical processors making up the physical processor.

The processor utilization on the part of a process of the operating system can be obtained by taking an interval in which to calculate the processor utilization for a logical processor as one continuous interval that the process of interest runs on the logical processor and by accumulating the utilizations thus calculated one after another. The processor utilization rate for a process can also be determined in exactly the same way as with the processor utilization rate for a logical processor. Although a single process, unlike logical processors, may run on a plurality of processors, this embodiment allows the processor utilization by a process to be determined in the same procedure as that of the logical processors without regard to the physical position of the logical processors, because the two logical processors in one physical processor point to one another, enabling the process to be located with a pointer whichever logical processor it may move to.

Since there is no big difference between the method of calculating the processor utilization and the processor utilization rate for logical processors described above and the method of calculating the processor utilization and the processor utilization rate for a physical processor and a process, the latter will not be given further explanations.

With the method of calculating the processor utilization and the processor utilization rate according to this invention, an SMT operation mode-aware processor utilization and processor utilization rate in any sample interval and in any desired block can be calculated on-line and asynchronously for each logical processor, operating system process and SMT processor without requiring any dedicated, special hardware mechanism. This is shown in the embodiment specifically in the configuration of FIG. 7.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of calculating a processor utilization for multiple logical processors in a computer having a physical processor, the multiple logical processors running on the physical processor and a memory on which an operating system (OS) is loaded;
   wherein the physical processor is a simultaneous multi-threading (SMT) processor and each of the logical processors has two operation modes including a single task mode in which only one of them is active and a multitask mode in which the multiple logical processors are active;
   wherein the OS has a processor utilization rate monitoring means, and the processor utilization rate monitoring means is configured to execute a method that comprises the steps of:
      defining one computation interval, for which the processor utilization for each of the logical processors is to be calculated, as an interval of an arbitrary length in which the logical processor being calculated is active from its start to end without transiting to an inactive state;
      managing a sleep start time and a sleep exit time for each of the multiple logical processors; and
      calculating the processor utilization of a first logical processor of the multiple logical processors by the following steps of:
         determining a run time of the first logical processor in the computation interval based on a sleep start time and a sleep exit time of the first logical processor;
         determining a sleep time of a second logical processor of the multiple logical processors in the computation interval based on a sleep start time and a sleep exit time of the second logical processor;
         dividing the run time of the first logical processor in the computation interval into a single task mode execution interval of the first logical processor and a multitask mode execution interval of the first logical processor using the determined sleep time of the second logical processor in the computation interval; and
         taking a total value of the single task mode execution interval of the first logical processor and the multitask mode execution interval multiplied by a predetermined multitask mode processor resource assignment ratio as the processor utilization of the first logical processor being calculated in the computation interval.

2. The calculation method according to claim 1, wherein the run time of the first logical processor in the computation interval and the sleep time of the second logical processor in the computation interval are calculated by using only a cycle counter that can be referenced for each logical processor and shared data between the first and second logical processors.

3. The calculation method according to claim 1, wherein the calculation of run time of the first logical processor in the computation interval and the sleep time of the second logical processor in the computation interval is performed asynchronously between first and second logical processors.

4. The calculation method according to claim 1, wherein the multitask mode processor resource assignment ratio is dynamically changed to a desired value.

5. The calculation method according to claim 1, wherein the processor utilization rate monitor means is configured to execute a method which comprises the steps of:
   in calculating the sleep time of the second logical processor in the computation interval, storing in each of the logical processors in the SMT processor the sleep time obtained by accumulating the run times, each lasting from a sleep start time to a subsequent sleep exit time of the logical processor, and also a most recent sleep start time and a most recent sleep exit time;
   using these data as shared data between the first and the second logical processors;
   determining a start time and an end time of each computation interval and keeping them until the end of the calculation;
   determining a difference in the sleep time of the second logical processor between the end time and the start time of the computation interval;
   at the start of the processor utilization computation, referring to a most recent sleep start time and a most recent sleep exit time of the second logical processor;
   when the most recent sleep start time is greater than the most recent sleep exit time, deciding that the second logical processor is in a sleep state and determining an excess portion of the difference, which are discrete data, to be equal to a difference between the most recent sleep start time and the computation interval start time;
   when the most recent sleep start time is smaller than the most recent sleep exit time, deciding that the second logical processor is in an active state and determining the excess portion of the difference to be equal to zero;
   at the end of the processor utilization computation, referring to the most recent sleep start time and the most recent sleep exit time of the second logical processor;
   when the most recent sleep start time is greater than the most recent sleep exit time, deciding that the second logical processor is in a sleep state and determining a shortage portion of the difference, which are discrete data, to be equal to a difference between the computation interval end time and the most recent sleep start time;
   when the most recent sleep start time is smaller than the most recent sleep exit time, deciding that the second logical processor is in the active state and determining the shortage portion of the difference to be equal to zero; and
   subtracting the excess portion from and adding the shortage portion to the second logical processor's accumulated sleep duration difference between the end time and the start time of the computation interval to determine online and asynchronously based on a before-and after relation between two times the second logical processor's sleep time in the computation interval.

* * * * *